No. 890,648. PATENTED JUNE 16, 1908.
W. HIBBS.
CORN GATHERING MACHINE.
APPLICATION FILED JAN. 25, 1907.
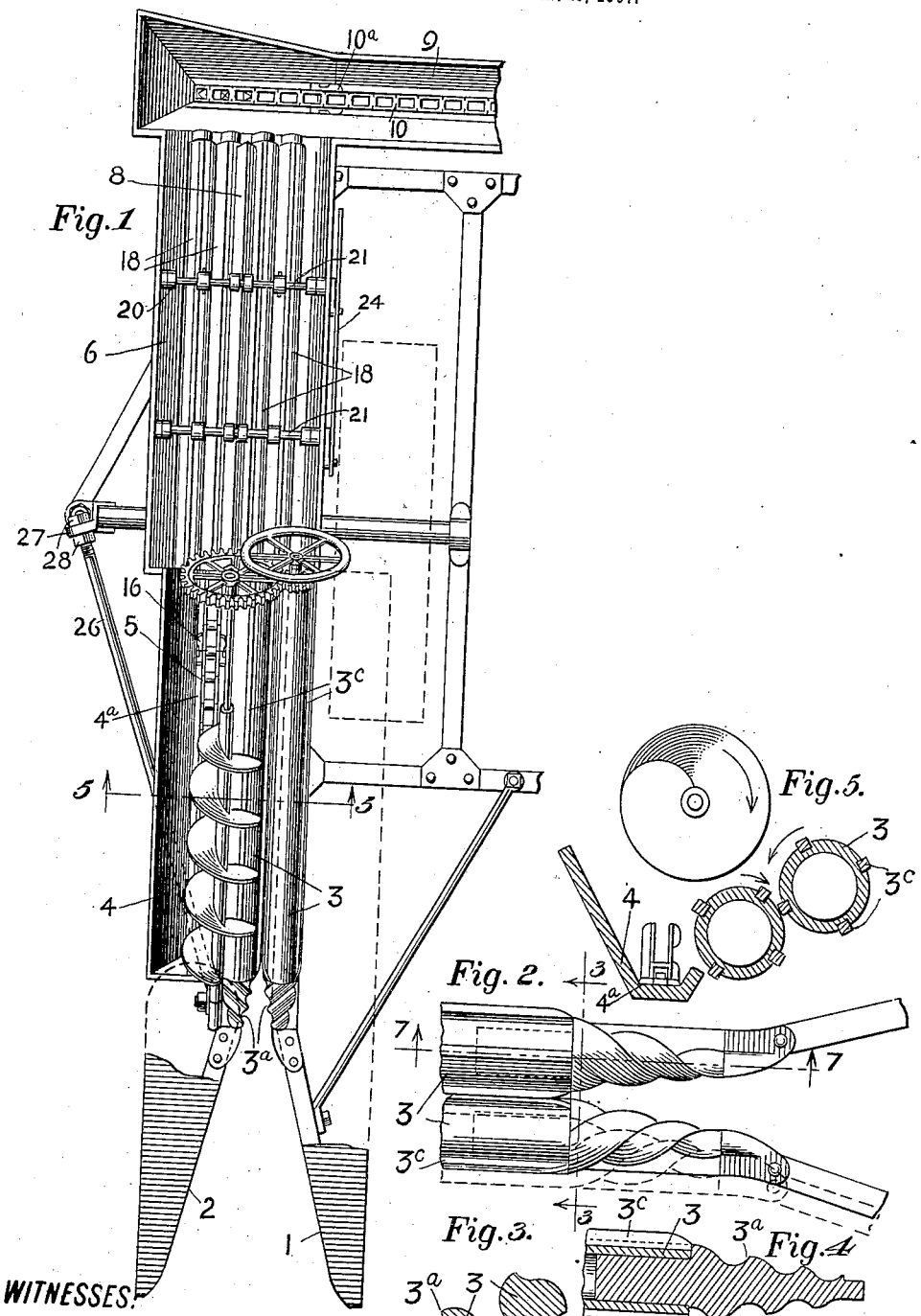
WITNESSES:
M. Gertrude Ady
J S Abbott
INVENTOR
Wm Hibbs
By Burton + Burton
his attys.

UNITED STATES PATENT OFFICE.

WILLIAM HIBBS, OF PLANO, ILLINOIS, ASSIGNOR TO INDEPENDENT HARVESTER COMPANY, OF PLANO, ILLINOIS, A CORPORATION OF MAINE.

CORN-GATHERING MACHINE.

No. 890,648.  Specification of Letters Patent.  Patented June 16, 1908.

Application filed January 25, 1907. Serial No. 354,013.

*To all whom it may concern:*

Be it known that I, WILLIAM HIBBS, a citizen of the United States, residing at Plano, in the county of Kendall and State of Illinois, have invented new and useful Improvements in Corn-Gathering Machines, of which the following is a specification, reference being had to the accompanying drawings, forming a part thereof.

This invention is an improvement upon the corn-gathering machine shown in patent No. 684,934, granted to myself and T. H. Seevers, dated October 22, 1901.

It consists of the specific features of construction shown and described and indicated in the claims.

In the drawings:—Figure 1 is a plan view of the grainward portion of the machine comprising the stalk-gathering arms and devices mounted thereon and rearward thereof. Fig. 2 is a detail view on a large scale of the forward or lower end portion of the picking or snapping rolls shown in Fig. 1. Fig. 3 is a section at the line 3—3 on Fig. 2. Fig. 4 is a section at the line 4—4 on Fig. 2. Fig. 5 is a section at the line 5—5 on Fig. 1.

This invention relates to a corn gathering machine having stalk-gathering arms, 1 and 2, (see Fig. 4) upon which respectively are mounted the snapping rolls, 3, 3, between which the stalks are engaged as the machine advances and which are rotated by mechanism requiring no specific description so as to draw the stalks downward between them and snap the ears off at the upper side of the rolls, the ears being received in a trough, 4, located at the grainward side of the snapping rolls having a conveyer chain, 5, traveling up rearward at its bottom for carrying the ears up and delivering them over its upper end into a rearwardly descending chute or trough, 6, the bottom of which is formed by husking rolls, 18, in two pairs located parallel and separated by a dividing ridge or deflector, 8. At the bottom of the chute, 6, at the lower end of the husking rolls, 18, the husked ears are received at the lower end of a transverse elevator and conveyer comprising the trough, 9, in which an endless chain conveyer, 10, operates traveling in the bottom of the trough for carrying the ears upward therein by means of the fingers, 10ª, on said chain. This transverse conveyer extends across the entire width of the machine so that its upper delivery end may overhang at the stubbleward side of the machine a wagon which may travel with the machine and receive the husked ears as fast as they are delivered.

In a machine of this general type, my several improvements comprise:—First, a novel form of picking or snapping rolls. Second, a special construction of picking rolls for better engagement of the stalks. Third, means for varying at will the spread of the gathering arms and slanting rolls.

The first feature is most clearly shown in Figs. 2 and 3 and is characterized by the tapered lower end terminals of these rolls which are spirally fluted or ribbed at their tapering portion, the spiral fluting ribs, 3ª, being of such form that the roll in cross section at this part is ratchet-like; that is, the fluting rib or groove has the rearwardly facing shoulder relatively abrupt, as may be observed most clearly in the axial section of this portion of the roll, Fig. 4. The purpose of this construction is that the stalks which are engaged between the tapered and fluted lower ends of the clamping rolls are prevented from escaping from such engagement and are more positively fed rearward into full engagement between the rolls at the full diameter of the latter.

The second feature of improvement relating to the snapping rolls is seen in Fig. 5, consisting in the longitudinal ribs, 3ᶜ, with which the rolls are provided, the rolls being assembled in the structure so that the ribs of the two rows alternate with each other as they rotate, as may be understood from said Fig. 5. The engagement of the stalks is thus rendered more positive than would be effected by smooth rolls, and at the same time the stalks are not liable to be broken as by grooved and intermeshing rolls.

The third feature of my improvements consists in bracing and securing the stubbleward gathering arm, 2, by a rod, 26, which extends obliquely stubbleward, rearward and upward to a lug, 27, on the frame, through which it extends and to which it is secured by nuts, 28, at each side of the lug. By adjusting the nuts, the rod is made to draw the stubbleward gathering arm which carries one of the snapping rolls and the elevator for carrying the ears up rearward more or less away from the other gathering arm and roll, so that when the stalks are exceptionally heavy the work imposed upon the snapping rolls in feeding them through is not unduly increased, but only such engagement caused as necessary to accomplish the desired purpose of holding the stalks while the ears are snapped off.

It will be understoood that the stubbleward gathering arm is exceptionally stiff and is secured with sufficient rigidity to the frame so that it reacts from any lateral deflection to which it is subjected by the rod, 26, whenever that rod is let out to permit the two rolls and gathering arms to approach nearer together, but the rod, 26, being sufficiently stiff will also, if necessary, operate to crowd the stubbleward gathering arm toward the grainward arm if its own elastic reaction should not carry it far enough to cause the approach of the rolls, 3, 3, to be sufficiently close for engaging slender stalks.

I claim:—

In a corn gathering machine, in combination with gathering arms and snapping rolls mounted thereon, an adjusting strain rod connecting the forward end of one of the gathering arms with the frame, and means for adjusting said rod to determine the spread or proximity of the two arms and rolls.

In testimony whereof, I have hereunto set my hand, in the presence of two witnesses, at Plano, Illinois, this eighth day of January, 1907.

WILLIAM HIBBS.

In the presence of—
IVAN L. SMITH,
JOSEPH BADU.